(12) United States Patent
Brelage et al.

(10) Patent No.: US 7,937,354 B2
(45) Date of Patent: May 3, 2011

(54) PROVIDING RESULTS FROM EXTERNAL RULE ENGINES BASED ON RULE ENGINE VOCABULARIES

(75) Inventors: Christian Brelage, Muenster (DE); Carsten Ziegler, Walldorf (DE); Tobias Rieke, Muenster (DE)

(73) Assignee: SAP AG, Walldorf (DE)

( * ) Notice: Subject to any disclaimer, the term of this patent is extended or adjusted under 35 U.S.C. 154(b) by 754 days.

(21) Appl. No.: 11/872,328

(22) Filed: Oct. 15, 2007

(65) Prior Publication Data

US 2009/0099994 A1 Apr. 16, 2009

(51) Int. Cl.
*G06F 17/00* (2006.01)
*G06N 5/02* (2006.01)

(52) U.S. Cl. .............. 706/47; 706/59; 706/60

(58) Field of Classification Search .......... None
See application file for complete search history.

(56) References Cited

U.S. PATENT DOCUMENTS

| | | | |
|---|---|---|---|
| 5,774,661 A * | 6/1998 | Chatterjee et al. | 709/203 |
| 6,473,748 B1 * | 10/2002 | Archer | 706/45 |
| 6,993,514 B2 * | 1/2006 | Majoor | 706/47 |
| 7,020,869 B2 * | 3/2006 | Abrari et al. | 717/108 |
| 2004/0064343 A1 * | 4/2004 | Korpman et al. | 705/2 |
| 2004/0215586 A1 * | 10/2004 | Koono et al. | 706/45 |
| 2005/0091357 A1 * | 4/2005 | Krantz et al. | 709/223 |
| 2008/0052308 A1 * | 2/2008 | Zhang | 707/102 |
| 2010/0257604 A1 * | 10/2010 | Zhou et al. | 726/22 |

OTHER PUBLICATIONS

N. Bhatti & W. Hassan, "Object Serialization and Deserialization Using XML", 2000, McGraw-Hill Publishing Company Ltd., pp. 1-10.*
Microsoft Computer Dictionay, Fifth Edition (pp. 1-5), 2002.*
Gergeleit, JRPC: connecting Java applications with legacy ONC RPC servers, 1999,Springer-Verlag,pp. 149-160.*
'SAP info' [online]. SAP, [retrieved on Apr. 9, 2009]. Retrieved from the Internet: <URL: http://sap.info/en>, 1 page.
Netweaver Based Engines (ABAP), [online]. SAP, [retrieved on Apr. 9, 2009]. Retrieved from the Internet: <URL: https://www.sdn.sap.com/irj/scn/wiki?path=/display/HOME/NetWeaver+Based+Engines+(ABAP)>, 3 pages.
Business Rule Framework [online]. SAP, 2004 [retrieved on Apr. 9, 2009]. Retrieved from the Internet: <URL: http://help.sap.com/saphelp_erp2004/helpdata/en/dc/38bb4006d9cc38e10000000a155106/frameset.htm>, 2 pages.
B2B Integration—Aligning ebXML and Ontology Approaches' [online]. Hofreiter & Huemer, 2002, [retrieved on Apr. 9, 2009]. Retrieved from the Internet: <URL: http://www.cs.univie.ac.at/upload/publications/00000.281-eurasia-final.pdf>, 9 pages.
'Case-Based Reasoning for Data Warehouse Schema Design' [online]. Mathew et al., 2006, [retrieved on Apr. 13, 2009]. Retrieved from the Internet: <URL: http://eprints.qut.edu.au/4801/1/4801_1.pdf>, 13 pages.

* cited by examiner

*Primary Examiner* — Michael B. Holmes
*Assistant Examiner* — Stanley K Hill
(74) *Attorney, Agent, or Firm* — Fish & Richardson P.C.

(57) ABSTRACT

An enhanced rule engine, in which a rule-evaluated result that is received from an external rule engine based on a context transmitted to the external rule engine for evaluation by the rule and on a schema document serializing an automatically generated vocabulary transmitted to the external rule engine is output. The schema document defines the business rule based on a context description and a result description included in the vocabulary, and the context and the result are respectively specified according to the context description and the result description.

20 Claims, 11 Drawing Sheets

US 7,937,354 B2

PROVIDING RESULTS FROM EXTERNAL RULE ENGINES BASED ON RULE ENGINE VOCABULARIES

FIELD

The present disclosure generally relates to process modeling.

BACKGROUND

A rule engine allows the execution logic of a process to be modeled in a straightforward and declarative manner. For example, a business rule engine processes the execution logic of a business process. In order to achieve higher agility and flexibility, business rule management systems (BRMSs) separate business-related application logic from other types of application logic, so that changes to business process models are easier to implement and do not necessarily require specialized programming skills. These BRMSs are used, for example, in public sector, financial, and insurance contexts.

SUMMARY

In order to exchange data with an external rule engine, a local rule engine exchanges a vocabulary (referred to as a business vocabulary (BV), a rule engine vocabulary, or an intermediate vocabulary) with the external rule engine, where the vocabulary provides the format, type, description or structure of the data to be exchanged between the local and external rule engines. The vocabulary is used by the external rule engine to define rules, such that contexts received by the external rule engine are appropriately processed, and responses are properly formatted and structured for receipt by the local rule engine.

According to one general implementation, a BV including a context description and a result description that respectively define an input to and an output of an external business rule engine is automatically generated based on using generic data structures, where the context description further includes a context data type that is native to the external business rule engine, An expression including a connection to the external business rule engine is defined, and the BV is serialized in an eXtensible Markup Language (XML) schema document (XSD) that, when received at the external business rule engine, allows a business rule to be defined based on the context description and the result description. The schema document is transmitted via the connection to the external business rule engine using a remote procedure call, and a context specified according to the context description is passed to the expression. The context is transmitted via the connection as the input to the external business rule engine, for evaluation by the business rule, a business rule-evaluated result specified according to the result description is received via the connection as the output of the external business rule engine, and the result is output.

According to another general implementation, a method includes outputting a rule-evaluated result received from an external rule engine based on a context transmitted to the external rule engine for evaluation by the rule and on a schema document serializing an automatically generated vocabulary transmitted to the external rule engine. The schema document defines the business rule based on a context description and a result description included in the vocabulary, and the context and the result are respectively specified according to the context description and the result description.

According to another general implementation, a rule engine vocabulary including a context description and a result description that respectively define an input to and an output of an external rule engine is automatically generated, the rule engine vocabulary is serialized in a schema document that, when received at the external rule engine, allows a rule to be defined based on the context description and the result description, and the schema document is transmitted to the external rule engine. A context specified according to the context description is transmitted as the input to the external rule engine, for evaluation by the rule, a rule-evaluated result specified according to the result description is received as the output of the external rule engine, and the result is output.

Implementations may include one or more of the following features. For instance, the rule engine vocabulary may be generated based on using generic data structures, such as a field, structure, or table data element. An expression including a connection to the external rule engine may be defined, and the context may be passed to the expression, thereby causing the schema document and the context to be transmitted via the connection, and the result to be received via the connection. Defining the expression may further include querying the rule engine to determine connection parameters, and selecting the defined expression from a list of possible expressions based on the determined connection parameters. The context may be automatically transmitted to the external rule engine via a remote procedure call, if the expression is triggered. The result is received via the remote procedure call, such as a SUN MICROSYSTEMS® JAVA® programming language remote procedure call.

In further examples, the context description may further include a context data type that is native to the external rule engine. The rule may be defined at the external rule engine based on the context description and the result description. The schema document may be an XSD. The external rule engine may be a business rule engine such as a BRMS, the rule engine vocabulary may be a BV, and the external rule engine may be a business rule engine.

According to another general implementation, a computer program product is tangibly embodied in a machine-readable medium. The computer program product includes instructions that, when read by a machine, operate to cause a data processing apparatus to automatically generate a rule engine vocabulary including a context description and a result description that respectively define an input to and an output of an external rule engine, to serialize the rule engine vocabulary in a schema document that, when received at the external rule engine, allows a rule to be defined based on the context description and the result description, and to transmit the schema document to the external rule engine. The computer program product also includes instructions that, when read by a machine, operate to cause a data processing apparatus to transmit a context specified according to the context description as the input to the external rule engine, for evaluation by the rule, to receive a rule-evaluated result specified according to the result description as the output of the external rule engine, and to output the result.

According to another general implementation, a device includes a processor, an interface, and an output module. The processor automatically generates a rule engine vocabulary including a context description and a result description that respectively define an input to and an output of an external rule engine, and serializes the rule engine vocabulary in a schema document that, when received at the external rule engine, allows a rule to be defined based on the context description and the result description. The interface transmits the schema document to the external rule engine, transmits a context specified according to the context description as the input to the external rule engine, for evaluation by the rule, and receives a rule-evaluated result specified according to the result description as the output of the external rule engine. The output module outputs the result.

The details of one or more implementations are set forth in the accompanying drawings and the description, below. Other features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
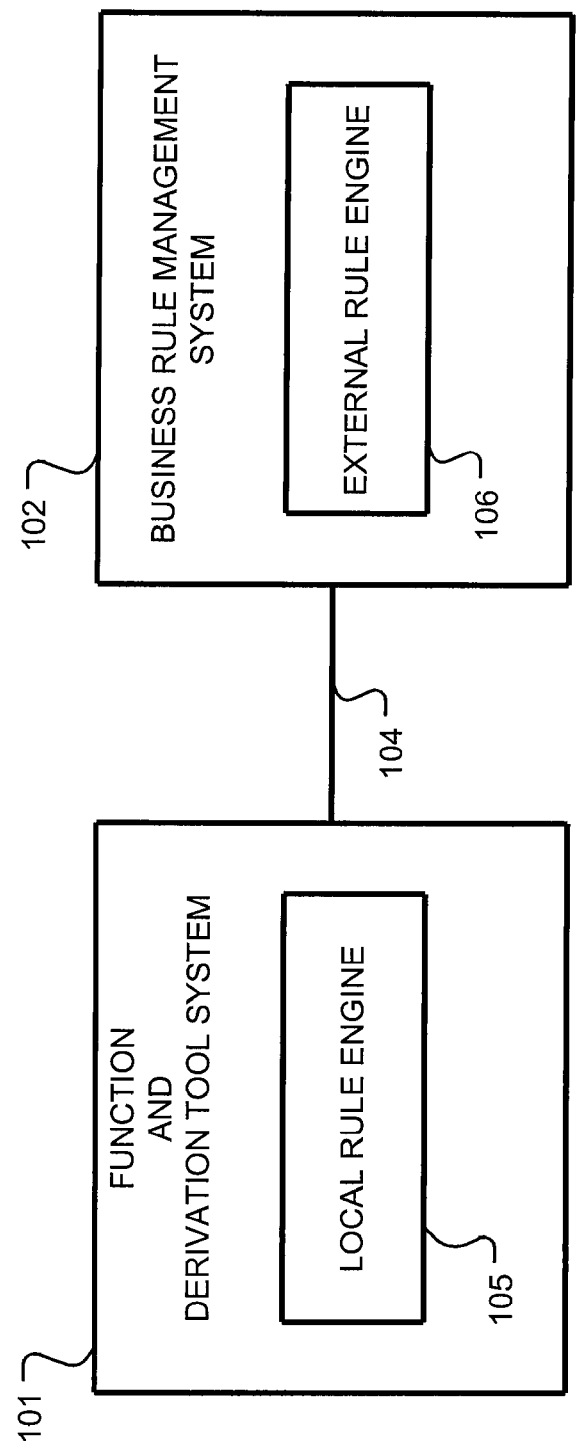
FIGS. 1 and 5 are block diagrams of an exemplary system that implements an enhanced rule engine.

A business process is a series of business tasks or activities executed in a coordinated order. Applications allow business processes that span multiple functional areas to be modeled using business objects and functions that are processed by a local business rule engine.

A task is the atomic business process component that describes an activity or alters a business process's control flow, for instance by splitting or joining the business process flow. An exemplary business process may include a dedicated begin task, and sequentially executed first through third tasks that each occur prior to the dedicated end task. The execution of certain tasks may require the invocation of an external business rule engine that provides partner-supplied functionalities or logic.

Under these circumstances, the local business rule engine (also referred to herein as a primary or proprietary business rule engine, or a 'Function & Derivation Tool' (FDT)) may be integrated with external or third party business rule engines (or third party BRMSs). For instance, an entity may wish to access a pre-configured third party payroll accounting rule set that is provided or optimized for a specific platform or application. By describing these other business rule engines as 'external,' it is merely intended that these engines are distinct from the primary or local business rule engine. Thus, a business rule engine may be referred to as 'external' even if it is executing on the same machine as the local business rule engine, or is associated with the same operator as the local business rule engine.

In order to exchange data with the external rule engine, the local rule engine first exchanges a vocabulary with the external rule engine, where the vocabulary provides the format, type, description or structure of the data to be exchanged between the local and external rule engines. The vocabulary allows, causes or effects the definition of rules at the external rule engine, such that input data (or 'contexts') received by the external rule engine is appropriately processed, and output data (or 'responses') are properly formatted and structured for the local rule engine. Based on this vocabulary exchange, rule-evaluated result data may be easily imported by the local rule engine and processed further.

The vocabulary is automatically generated at the local rule engine during a design time phase, using context and result information. During a runtime phase (i.e. after the deployment or definition of the rule at the external rule engine), the local rule engine may invoke the deployed rule at the external rule engine by passing data (i.e. the context) to the external rule engine. Using the rule that was defined based on the expected context format, type, description or structure, the external rule engine receives and processes the context using the rule, and returns a resulting data set to the local rule engine, in the appropriate format.

In doing so, a business entity is better able to fulfill customer requirements, particularly in the public sector, insurance, and finance fields. Furthermore, functional gaps of local rule engines are filled, since leading BRMSs which utilize proprietary or specialized rule engines may still be used by the local rule engines. Thus, the user is not committed to a particular FDT, and is offered a best-of-breed approach to modeling business processes, thereby enhancing the overall customer experience. From the perspective of the FDT producer, seamless integration of third party rule engines may improve their market position as well, since BRMS providers may tailor their own products to enhance existing FDT solutions.

FIG. 1 is a block diagram of an exemplary system 100 that implements an enhanced rule engine. Briefly, the exemplary system 100 includes an FDT system 101 and a BRMS 102, connected by way of a network 104.

The FDT system 101, which may implement the SAP® NETWEAVER® FDT, includes a local rule engine 105 that defines and processes business rules and that outputs data using a comprehensive application programming interface (API). The local rule engine 105 is a hardware or software module that manages and automates business rules. The BRMS 102 includes an external rule engine 106 that also defines and processes business rules, and that outputs results of the external rule processing to the FDT system 101.

In one example configuration, the external rule engine 106 includes specialized, customized, proprietary, or protected (such as by patent or trade secret) business rules that the local rule engine 105 may wish to use or access. In a financial context, the external rule engine may provide a credit scoring function which accepts inputs regarding a customer's credit history, such as annual income or recent payment delinquencies, and which outputs a credit score that rates the consumer against a pool of consumers. If the FDT system 101 is operated by a mortgage provider, the resulting credit score may be used to determine whether to grant a loan to a consumer.

In this example, the operator of the BRMS 102 may not want to release the credit scoring logic used by the external rule engine 106 to derive the credit score, to prevent entities from discovering weaknesses that might artificially inflate a person's credit score. At the same time, the operator of the FDT system 101 may not want a user of the local rule engine 105 to know that a credit score is being sought, or require a user to take any extra steps to access credit score data.

Thus, and using the enhanced approach described herein, the local rule engine 105 may seamlessly interface with the BRMS 102 by executing a function that is itself internal to the FDT system 101, but which includes an expression that calls the external rule engine 106. In the described example, the expression may call the external rule engine by supplying context information that uniquely identifies a customer, in a format, structure or data type that is readily understood by the external rule engine based on an earlier-provided BV that assists, allows, causes or effects the definition of the external business rule.

The external rule engine 106 evaluates or processes the context using the rule, and provides result information (or, simply, a 'result') back to the local rule engine 105 in a format, structure or data type that is readily understood by the local rule engine 105. The result provided by the external rule engine 106 is parsed by the expression (or parse tree) of the local rule engine 106 associated with the called function, and an output of the function is returned to the user of the FDT system 101 based on the result.

Thus, the 'function' of the 'Function & Derivation Tool' refers to the triggering of processing of rule-based logic at the external rule engine 106 through the use of a place-holding expression that seamlessly invokes communication to an external rule engine. The 'derivation' of the 'Function & Derivation Tool' refers to a parse tree (or expression tree) that provides for the parsing of contextual input. For example, the derivation may be as sequence of statements (such as in logic or mathematics) indicating that a result is a natural consequence of previously accepted statements.

In a similar regard, an expression may thus be any combination of values, functions, tokens, atoms, and procedures, interpreted according to the particular rules of precedence and of association for a particular expression type, which computes and then returns another value. Similarly, an expression type describes the rules of precedence and association for a defined context. For each application executing a particular business process, filters may restrict the use of certain expression types, expressions, or functions, in order to reduce the quantity of available objects in a given scenario.

As inferred above, the input to an function or expression is referred to as the 'context,' and the output (or return value) of an expression is referred to as a 'result.' Both the context and the result may include data elements such as fields, structures or tables, or a set of data objects such as a scalar value, a work area, or a vector value, where a scalar refers to a variable that holds one value at a time, and a vector is a collection of scalars.

In one example instance, a function that models a health insurance business rule may include an expression that accepts a table listing multiple patient names as input, or that accepts a single element indicative of a single patient name as input. This function may output an elemental data field indicating whether any of the patients named in the table are insured by an entity executing the business rule, or may output a table listing dates and descriptions of recent medical treatments. The 'rule' may thus be understood as an expression or hierarchy of expressions assigned to a particular function, such as an insurance fraud detection function, a credit scoring function, or other exemplary function. The specific rule applied to the input context may depend on the type, description, or structure of the input context.

In another example instance, 'business objects' are input into each business process, where business objects represent uniquely identifiable business components, entities, or data described by a structural model, an internal process model, or service interfaces. Example business object types includes core or hosting business object (e.g. a purchase order, a customer invoice request, or a purchase order), replicated business objects (e.g. a planning view on a core business object such as a purchase order), a business object template (e.g. a maximal template of product with all attributes), a dependent business object (e.g. a reuse part of another business object such as an address), a business foundation object (e.g. an object located in a foundation layer such as a business partner).

In contrast to a 'notion object,' a 'business object' describes an entity type and not necessarily the instance of the entity itself. Similarly, a dependent business object is a business object which is used (as a reuse part) in or by another business object, and which represents a concept that cannot stand by itself, from a business perspective. Although instances of dependent business objects may occur in the context of a business object, dependent objects are equivalent in terms of structure and functionality over a range of embedding objects.

Figure 2:
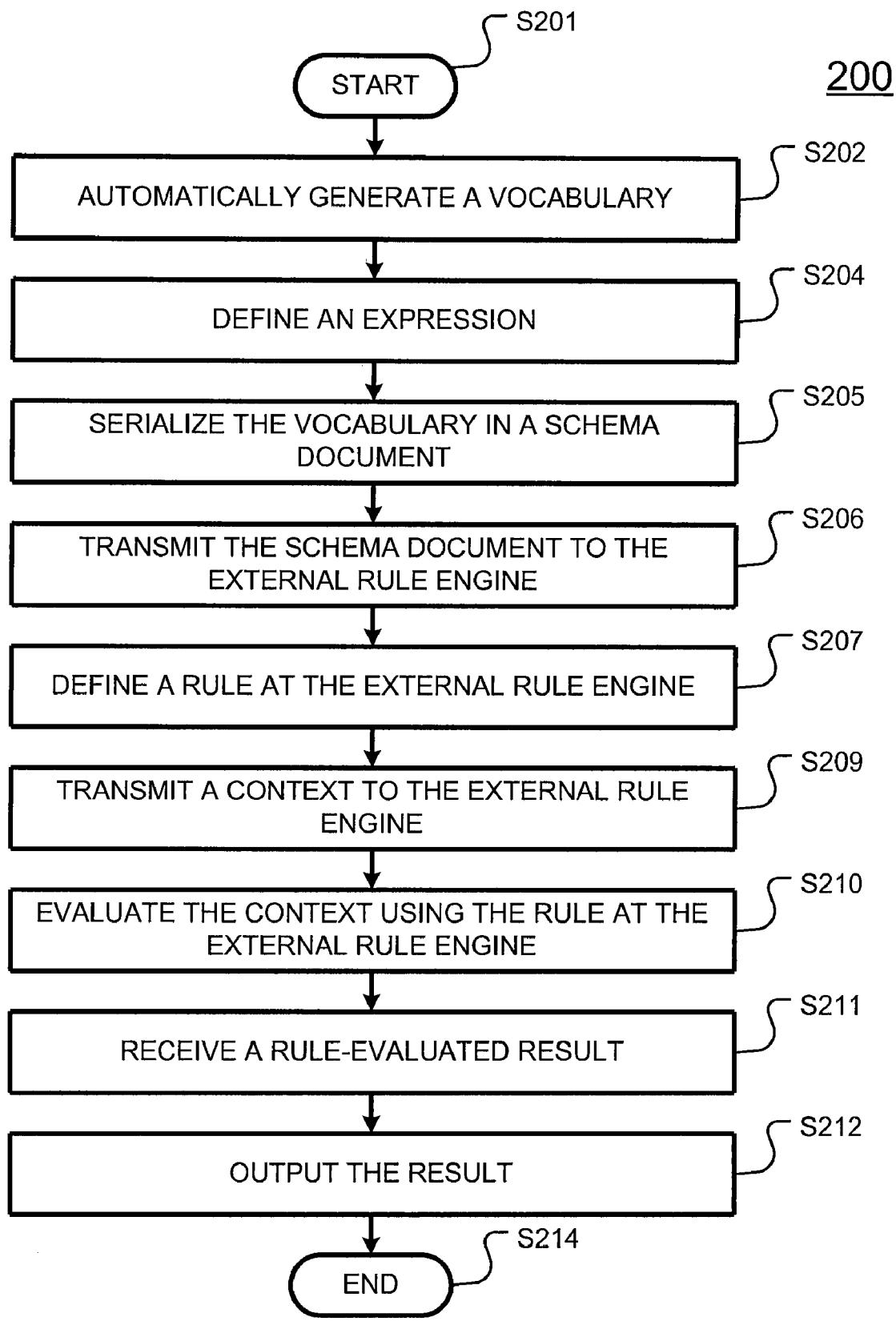
FIG. 2 is a flowchart illustrating an exemplary process for implementing an enhanced rule engine.

FIG. 2 is a flowchart illustrating an exemplary process 200 for implementing an enhanced business rules engine. Briefly, the process 200 includes automatically generating a rule engine vocabulary including a context description and a result description that respectively define an input to and an output of an external rule engine, serializing the rule engine vocabulary in a schema document that, when received at the external rule engine, allows a rule to be defined based on the context description and the result description, and transmitting the schema document to the external rule engine. A context specified according to the context description is transmitted as the input to the external rule engine, for evaluation by the rule, a rule-evaluated result specified according to the result description is received as the output of the external rule engine, and the result is output. The exemplary process 200 may be seen as a type of business rules framework (BRF) that provides a runtime and maintenance environment for the processing, implementation and configuration of technical and business rules.

In more detail, when the process 200 begins (S201), a rule engine vocabulary (or BV) including a context description and a result description that respectively define an input to and an output of an external rule engine is automatically generated (S202). In order to allow the FDT system (or a component of the FDT system such as the local rule engine) to access the BRMS, a function is modeled within the local rule engine to trigger the processing of the rule-based logic at the external rule engine through the use of a place-holding expression. Thus the function should be modeled or specified with data descriptions that can be understood by the external rule engines, so that appropriate data may be transmitted to the external rule engine based on a call to the function.

The local rule engine supports many different data object descriptions. For example, Table 1 lists different types of the 'data element' data object that are supported by an exemplary local rule engine, and Table 2 lists different types of the 'structure' data object that are supported by an exemplary local rule engine, where a structure generally refers to a list of similar-type data elements. In addition to data elements and structures, the exemplary local rule engine may also support a table data object, which (like a structure) includes a list of similar-type data elements but which (unlike a structure) includes defined headers.

TABLE 1

Data Element Data Object Types.

| Data Type Definition | Reference Type | Length |
|---|---|---|
| ELEMENT_BOOLEAN | CHAR | 1 |
| ELEMENT_CURRENCY | CURY | |
| ELEMENT_NUMBER | DF34_RAW | 34 |
| ELEMENT_TEXT | CHAR | 80 |
| ELEMENT_UNIT | CHAR | 3 |
| ELEMENT_AMOUNT | | |
| Number | ELEMENT_NUMBER | |
| Currency | ELEMENT_CURRENCY | |
| ELEMENT_QUANTITY | | |
| Number | ELEMENT_NUMBER | |
| Unit | ELEMENT_UNIT | |
| ELEMENT_TIMEPOINT | | |
| Date | DATS | |
| Time | TIMS | |
| Timestamp | TIMESTAMP | |
| Offset_time | TIMS | |
| Offset_sign | TZNUTCSIGN | |

TABLE 2

Structure Data Object Types

| Data Type Definition | Reference Type | Length |
|---|---|---|
| S_ELEMENT | STANDARD TABLE OF S_MESSAGE | |
| Position | N | 3 |
| Element_id | ID | |
| TS_ELEMENT | SORTED TABLE OF S_ELEMENT | |

The vocabulary should thus include, for each of the expected context and result, a description including a data type of the expected context and result. For instance, the vocabulary may describe that an expected context (or input) may be a patient name of type ELEMENT_TEXT, or a patient identification number of type ELEMENT_NUMBER, or an expected treatment cost of type ELEMENT_CURRENCY. The expected result (or output) may be similarly described. Since the expected inputs and outputs of the function are known to the FDT system, the FDT system may automatically generate its own BV for export to the external rule engine by referencing the expected inputs and outputs of a particular function. Notably, since the vocabulary is based on a context provided during the design time phase, it is not necessary for the rule engines to derive templates or schemas based on past communication.

The context description may be data type that is native to the external rule engine. For instance, the vocabulary may be automatically generated using generic data objects, such as a field, structure, or table data objects. In doing so, the vocabulary may be used to specify the basic language constructs that define the universe of discourse between the local and external rule engines. In this regard, the vocabulary may be viewed as a published description of the intended format, type or structure of the context and the result that are to be communicated between the local rule engine and the external rule engine.

Figure 3:
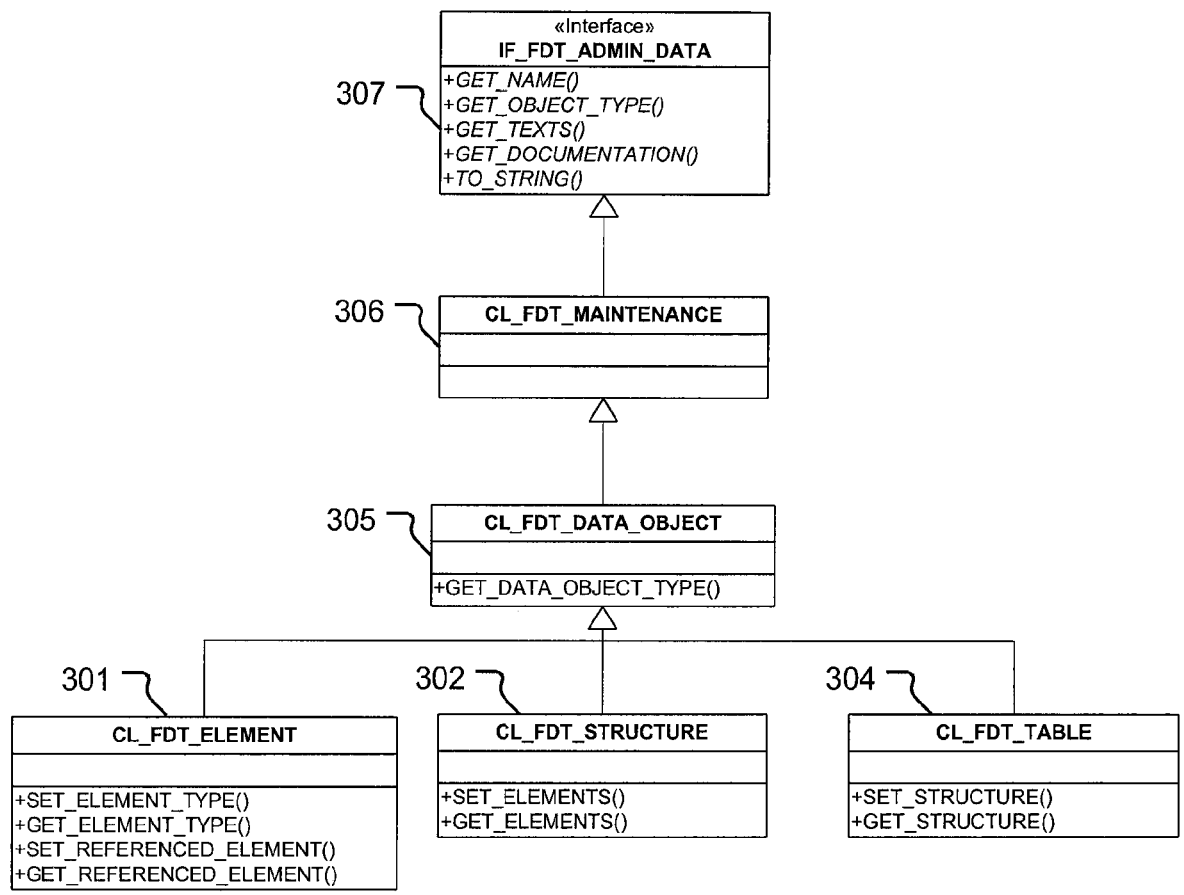
FIG. 3 illustrates the relationship between exemplary FDT data types.

Referring ahead briefly, FIG. 3 illustrates the relationship between exemplary local rule engine data types. The CL_FDT_ELEMENT class 301, the CL_FDT_STRUCTURE class 302, and the CL_TABLE class 304 each inherit characteristics and functions from the abstract CL_FDT_OBJECT class 305, which defines and implements generic methods and attributes. The CL_FDT_OBJECT class 305 inherits characteristics and functions from the CL_FDT_MAINTENANCE class, which addresses administrative data 307 and transaction handling. The top-level IF_FDT_ADMIN_DATA interface 307 centralizes various attributes to one interface for structured access to administrative methods and attributes.

Returning to FIG. 2, an expression including a connection to the external rule engine may be modeled, specified, or otherwise defined (S204) to logically connect the local rule engine to the external engine, thereby allowing for the communication of contexts and results data calls. The connection is defined as a placeholder EXTERNAL BRMS expression that allows the local rule engine to be seamlessly integrated with the external rule engine, using local rule engine-internal rule processing approaches. Since users of the local rule engine are not alerted to the external calls, complexity and integration costs are reduced.

The local rule engine may include generic expression subclasses such as the instance constant expression subclass, decision table expression subclass, a decision tree expression subclass, a formula expression subclass, and a function call expression subclasses, as well as the aforementioned EXTERNAL BRMS expression subclass that allows for communication between the local and external rule engines. The EXTERNAL BRMS expression subclass may include, for example an association to an abstract GENERIC BRMS CONNECTOR class that encapsulates parameters and function calls that are generally used to communicate with the external rule engine. The EXTERNAL BRMS expression instance is thus chosen, created, specified or otherwise defined within the expression tree at the local rule engine to connect the local rule engine to the external rule engine once the rule has been defined at the external rule engine (see infra, S207).

Defining the expression may further include querying the rule engine to determine connection parameters, and selecting the defined expression from a list of possible expressions based on the determined connection parameters. The EXTERNAL BRMS expression subclass may include EXECUTE( ), CLOSE( ), and GETPARAMETERS( ) functions that allow the local rule engine to determine these connection parameters and distinguish between various external rule engine application platform subclasses, using reflecting programming. For example, using the GETPARAMETERS( ) function, a local rule engine may determine that the external rule engine uses a Java adapter, and may specify an EXTERNAL BRMS expression that implements a Java BRMS connector that encapsulates parameters and function calls used to communicate with a Java Adapter of the external rule engine.

The rule engine vocabulary is serialized or packaged in a schema document (S205), which may be an XSD. Included in the schema document are the context and result definitions or descriptions that were automatically generated (see, supra, S202), so as to be provided to the external rule engine. Since the context or result may be an element, structure, table or other type of data, the schema document identifies which type of data the context or result is expected to be and provides a run-time XML element associated with the identified data type.

The schema document expresses a set of rules to which a document must conform in order to be considered 'valid' according to that schema. In this regard, other schema document languages or approaches, such as RELAX NG, or Document Type Definitions (DTDs), or Schematron may be substituted or used as an adjunct for an XSD. The vocabulary serialized in the schema document allows rules to be defined on the basis of the terms and relations encoded in the vocabulary.

Figure 4:
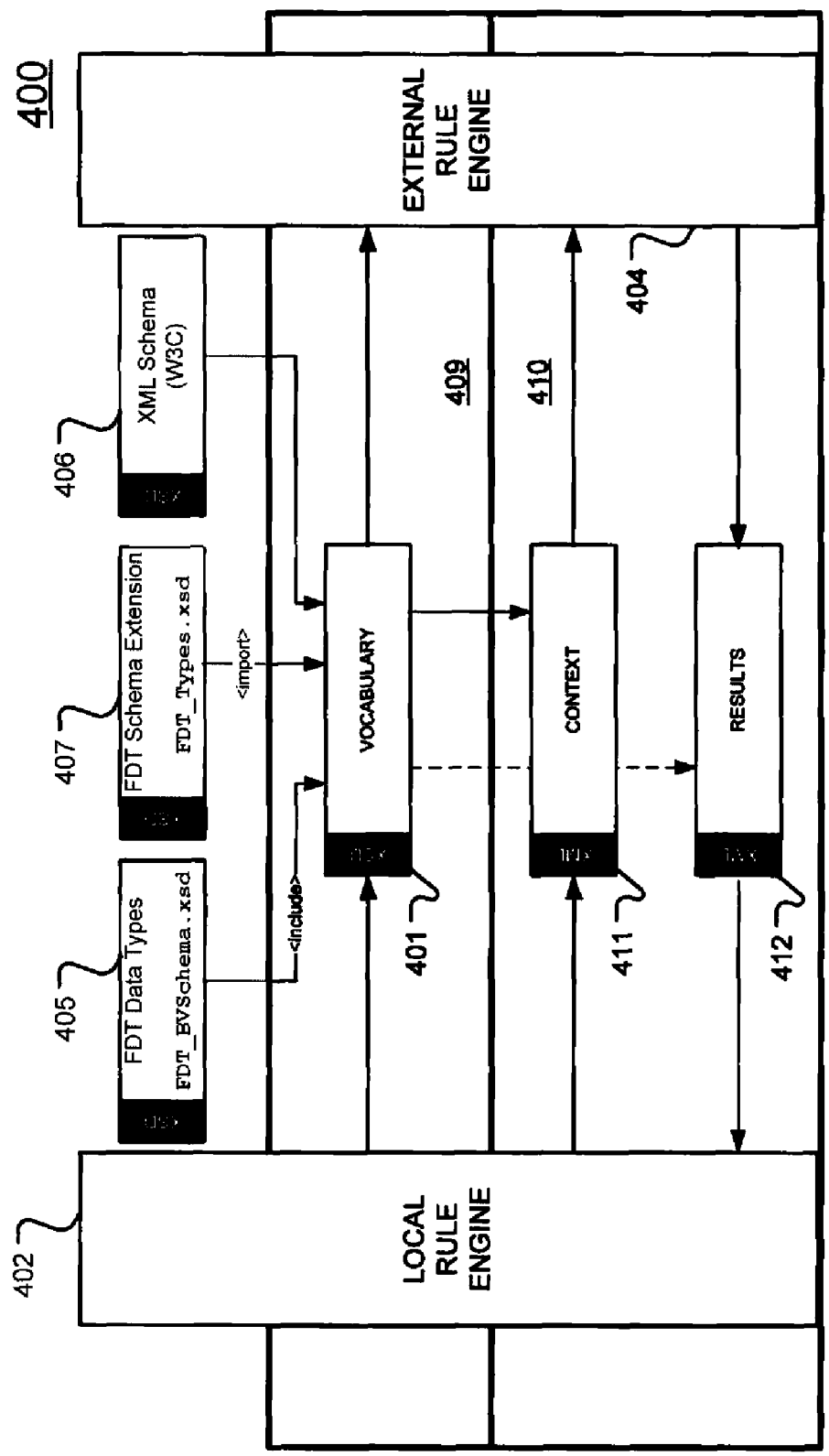
FIG. 4 illustrates the multiple layers associated with an exemplary schema document.

FIG. 4 illustrates the multiple layers associated with an exemplary schema document 401. Since the local rule engine 402 may pass various types of data to the external rule engine 404, such as proprietary data objects, generic or standardized data objects, or ABAP or other data objects, the schema document 401 should itself recognize each of these associated data objects in order to support a precise characterization of the associated data. In order to do so, the schema document 401 should include (via an <INCLUDE> element) a data type component 405 (FDT_BVSCHEMA.XSD) that specifies the types of data objects that the local rule engine is capable of communicating.

The schema document 401 should also incorporate standard components 406 (such as a W3C XML Schema), as well as a schema extension component 407 (FDT_TYPES.XSD) that extends the standard components 406 to specify a business context name and to define additional data constructs. The schema extension component 407 may be imported (via an <IMPORT> element) as a second namespace by the schema document 402. As indicated above, the schema document 401 is transmitted form the local rule engine 402 to the external rule engine 404 during a design time phase 409. As described in further detail below (see, infra, S209 to S211), the schema document 401 is used as a basis for defining a rule at the external rule engine 404, where the rule is used during a run time phase 410 to process contexts 411 generated by the local rule engine 402 according to the vocabulary, and to output results 412.

Table 3, below, illustrates a portion of an example schema document. In Table 3, line numbers have been added, for ease of reference.

TABLE 3

Example Schema Document

```
01 <?xml version="1.0" encoding="UTF-8"?>
02 <xs:schema xmlns:xs="http://www.w3.org/2001/XMLSchema"
03    xmlns:bv=" http:// xmlschema.sap.com/FDT_BVSchema.xsd"
04    targetNamespace="http://xmlschema.sap.com/ExampleSchema.xsd"
05    xmlns:tns=" http:// xmlschema.sap.com/ExampleSchema.xsd" >
06
07    <xs:import namespace=
         "http://xmlschema.sap.com/FDT_BVSchema.xsd" />
08    <xs:include schemaLocation=
         "http://xmlschema.sap.com/FDT_Types.xsd" />
09
10    <xs:element name="Patient_Name"
      type="tns:FDT_Element_Text">
11      <xs:annotation>
12        <xs:appinfo>
13          <bv:concept_name>Patient Name</bv:concept_name>
14        </xs:appinfo>
15      </xs:annotation>
16    </xs:element>
17 </xs:schema>
```

In the exemplary schema document shown in Table 3, line 01 is an XML declaration that specifies the version of XML being used (version 1.0), line 02 opens an XS:SCHEMA element, and lines 03 to 05 define target namespaces. Line 07 imports a schema extension component that extends the standard components to specify a business context name and to define additional data constructs. Line 07 includes a data type component that specifies the types of data objects that the local rule engine is capable of communicating. Lines 10 to 15 define a "Patient_Name" context element, of type ELEMENT_TEXT. From this element definition, the external rule engine should expect textual context data, presumably inputting a name of a patient, for further evaluation and processing by the rule.

The schema document is transmitted to the external rule engine (S206). A rule is defined and tested at the external rule engine based on the context description and the result description included in the received schema document (S207). When received at the external rule engine, the schema document allows a rule to be defined based on the context description and the result description. The schema document thus provides a basis for the definition of rules by the external rule engine.

The BV is derived from the FDT context, and is provided in a generic format in the schema document. From the BV, which is defined and provisioned during the design phase, the rule is defined by the BRMS during the design time phase and deployed for the runtime phase phase. Using the BV, the external rule engine uses an import function to link XMA and Java templates by associating XSD entities and attributes, or by creating or updating templates corresponding to XSD entities, or attributes of such templates that corresponding to XSD attributes and that refer to nested entities (where no more than one may occur). Furthermore, the external rule engine may create or update templates representing any XSD relationships other than tree structure, concepts implemented by such templates and attributes, relations between such concepts as exist between the templates and their attributes that correspond to the imported schema documents, or verb phrasings for such relations.

Concepts, relations, and verb phrasings can only be updated (not created), if an XML template is assigned. Therefore an initial provision of concepts, relations and verb phrasings may or may not occur using a default XSD-Import wizard.

A context specified according to the context description is transmitted as the input to the external rule engine, for evaluation by the rule (S209). The context may be automatically transmitted or exported to the external rule engine via a remote procedure call, if the expression is triggered. The context may be passed to the expression, thereby causing the schema document and the context to be transmitted via the connection, and the result to be received via the connection.

In the run time phase, the context is passed (as a data object) to the function defined in the local rule engine, which in turn applies the context to an expression tree. Using the EXTERNAL BRMS expression type defined within the function, the function provides the context (or a relevant portion of the context) to the external rule engine, which processes the context and returns a result. The function (at the local rule engine) receives and processes the result, and outputs data based on the processed result. The context is evaluated using the rule, at the external rule engine (S210).

A rule-evaluated result specified according to the result description is received as the output of the external rule engine (S211). The result is received via the remote procedure call, such as a SUN MICROSYSTEMS® JAVA® programming language remote procedure call.

The result is output (S212), thereby ending the process 200 (S214). The result may be further processed or evaluated locally prior to being output, and may be output to a human operator visually or auditorily, or may be output to another function or process for further evaluation. The external rule engine may be a business rule engine such as a BRMS, the rule engine vocabulary may be a BV, and the external rule engine may be a business rule engine. In the above credit-scoring example, outputting the result may output a credit score to the operator of the local rule engine or to a user, or the result may output an indication that the credit score is satisfactory or unsatisfactory relative to the modeled business process.

Figure 5:
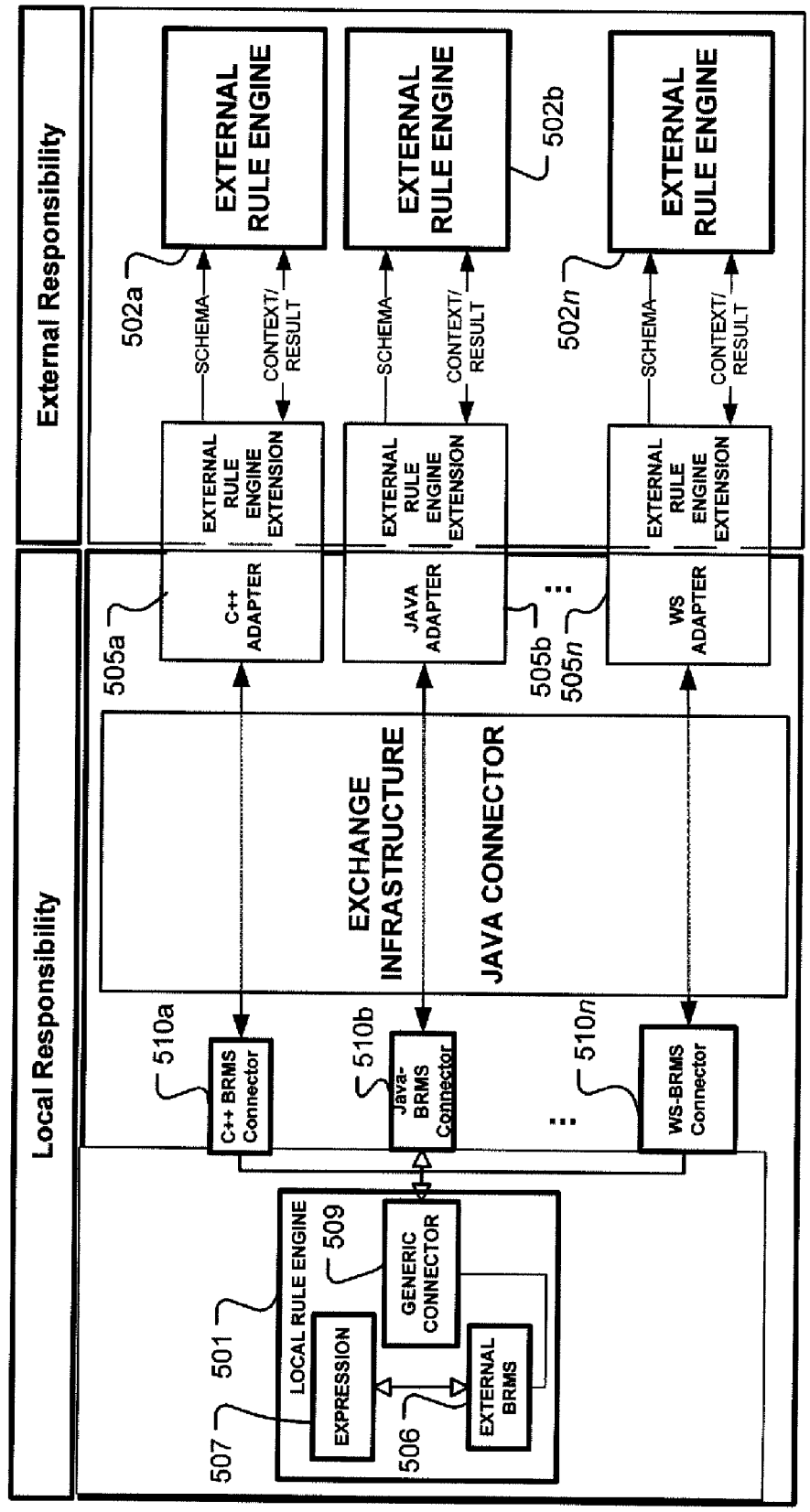

FIG. 5 is a block diagram of an exemplary system 500 that implements an enhanced rule engine. The system 500 includes a local rule engine 501 connected to external rule engines 502a to 502n (n representing any integer) via an exchange infrastructure 504, which may be a Java connector. The application platform subclasses associated with the external rule engines 502a to 502n may include JAVA J2SE, JAVA J2EE, C++, Delphi, ABAP, .NET, WebService, plain XML, or other subclasses.

For each of these application platform subclasses, a counterpart (such as counterparts 505a to 505n) is implemented within the external rule engine to specify the connection protocols and capabilities available to the external rule engines. The local rule engine 501 may thus automatically customize the EXTERNAL BRMS expression 506 for the target application platform using this counterpart information, allowing a broad range of application platforms to be used without requiring customization on the by the developer of the external rule engines 502.

In this regard, the local rule engine 501 communicates to with the external rule engines 502 by passing context information to a function, which includes an expression 507. The expression 507 includes an EXTERNAL BRMS expression 506, that includes an association to an abstract GENERIC BRMS CONNECTOR 509. The GENERIC BRMS CONNECTOR 509 respectively communicates with the C++ adapter counterpart 505a, the Java adapter counterpart 505b, and the WS adapter counterpart 505n of the external rule engines 502a to 502n using a C++ BRMS connector 510a, a Java connector 510b, and a WS-BRMS connector 510n.

Figure 6:
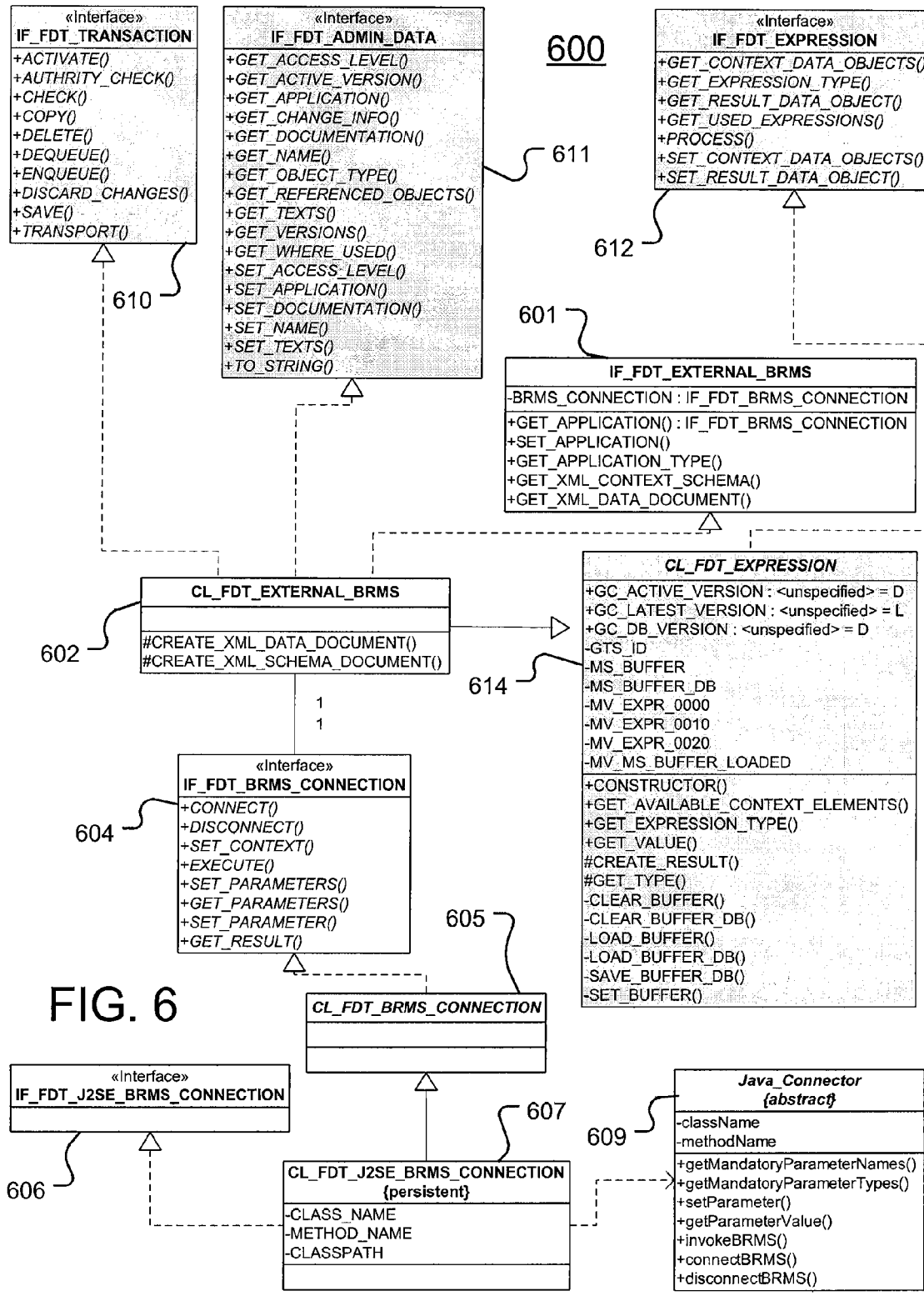
FIG. 6 illustrates an exemplary class structure implemented by the local rule engine.

FIG. 6 illustrates an exemplary class structure 600 implemented by the local rule engine. Standard components include an IF_FDT_EXTERNAL_BRMS component 601, a CL_FDT_EXTERNAL_BRMS component 602, an IF_FDT_BRMS_CONNECTION interface component 604, a CL_FDT_BRMS_CONNECTION component 605, an IF_FDT_J2SE_BRMS CONNECTION interface component 606, a CL_FDT_J2SE_BRMS_CONNECTION persistent component 607, and a Java_Connector component 609. Extension components include an IF_FDT_TRANSACTION interface component 610, an IF_FDT_ADMIN_DATA interface component 611, an IF_FDT_EXPRESSION interface component 612, and a CL_FDT_EXPRESSION component 614.

Figure 7:
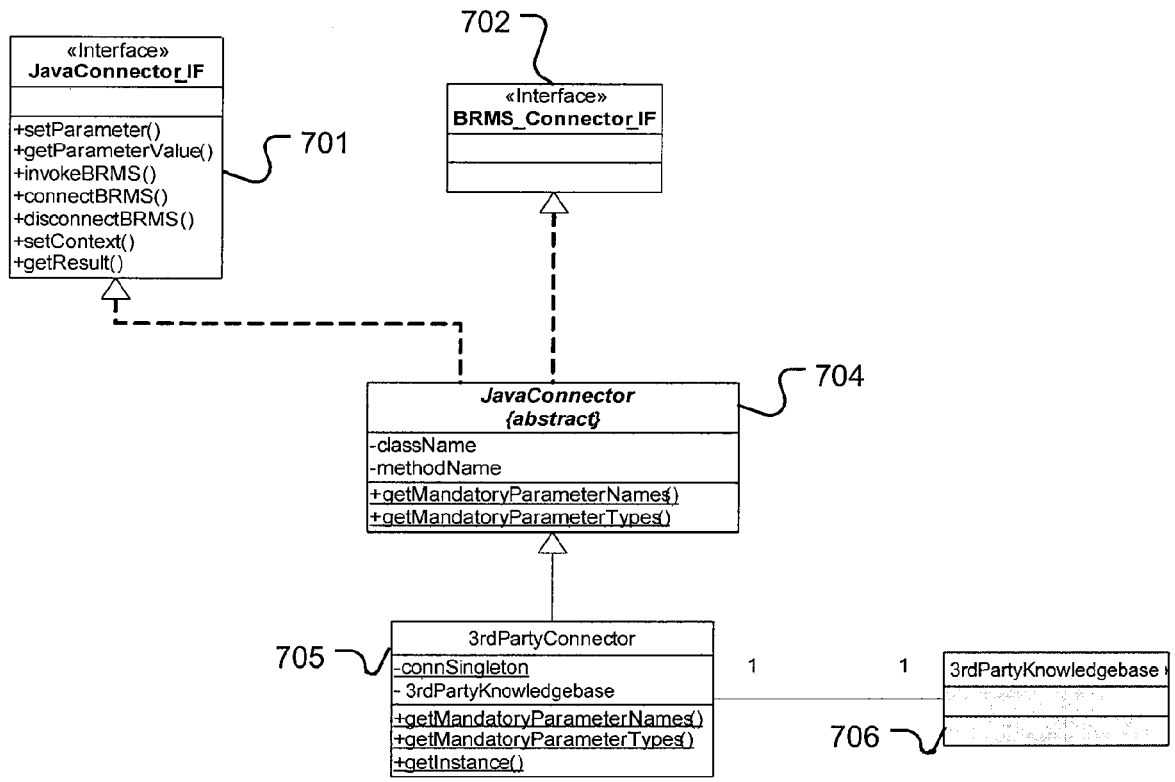
FIG. 7 illustrates an exemplary Java class structure implemented by the external rule engine.

FIG. 7 depicts an exemplary Java class structure 700 implemented by the external rule engine. The class structure 700 includes a JavaConnector_IF interface component 701, a BRMS_Connector_IF interface component 702, a JavaConnector component 704, a 3rdPartyConnector component 705, and a 3rdPartyKnowledgeBase component 706.

An example use of the enhanced rule engine is described below with respect to FIGS. 8 and 9, in the context of health insurance fraud detection. In this example, the external rule engine evaluates transactional data, such as patient or treatment data, and outputs an indication of whether a submitted invoice may be fraudulent. The local rule engine may execute on a physician's invoicing billing system, and may have access to a database storing the transactional data.

Medical doctors typically list prescribed treatments in order to claim reimbursement payments from the health insurance provider. Since the patients receiving the treatments may not be trained to review health insurance invoices for accuracy, unscrupulous medical doctors may bill a health insurance provider for phony treatments, by listing more treatments on an invoice than were actually applied.

Health insurance providers receive vast quantities of invoices for payment processing each day, making manual checking of invoices economically unfeasible. Thus, health insurance providers use automated mechanisms to check incoming invoices for inconsistencies that allude to this type of potential fraud, using logical ("if . . . then . . . ") tests.

For each invoice presented to the health insurance provider, a rule engine checks each invoice line item with respect to the described treatment personal data of the patient or regarding a given timeframe or on a single invoice. For instance, a rule may indicate that, if a patient receives a first treatment, then the patient is not supposed to get a second treatment on the same invoice. Another rule may dictate that, if a patient receives a first treatment, then the patient is not supposed to receive second and/or third treatments during the next quarter. Further rules may dictate that, if a patient receives rehabilitation treatment, then the rehabilitation treatment must start at most fourteen days after the surgery; or that if a patient receives a free preventive medical checkup, then he must be male and at least thirty year old.

It is also beneficial to be able to create arbitrary compositions of treatments for consistency checks, which is covered by chaining functionality provided by business rule engines. An external rule engine should be provided with access to the entire treatment history over a relevant time frame (i.e. the period on which consistency checks are necessary) of a patient, otherwise it may not be possible to accurately perform a consistency check. As such, the local rule engine may transfer the entire treatment history of the patient (in a loosely coupled integration scenario) or may merely provide a lookup functionality to the external rule engine (in a tighter integration scenario).

Figure 8:
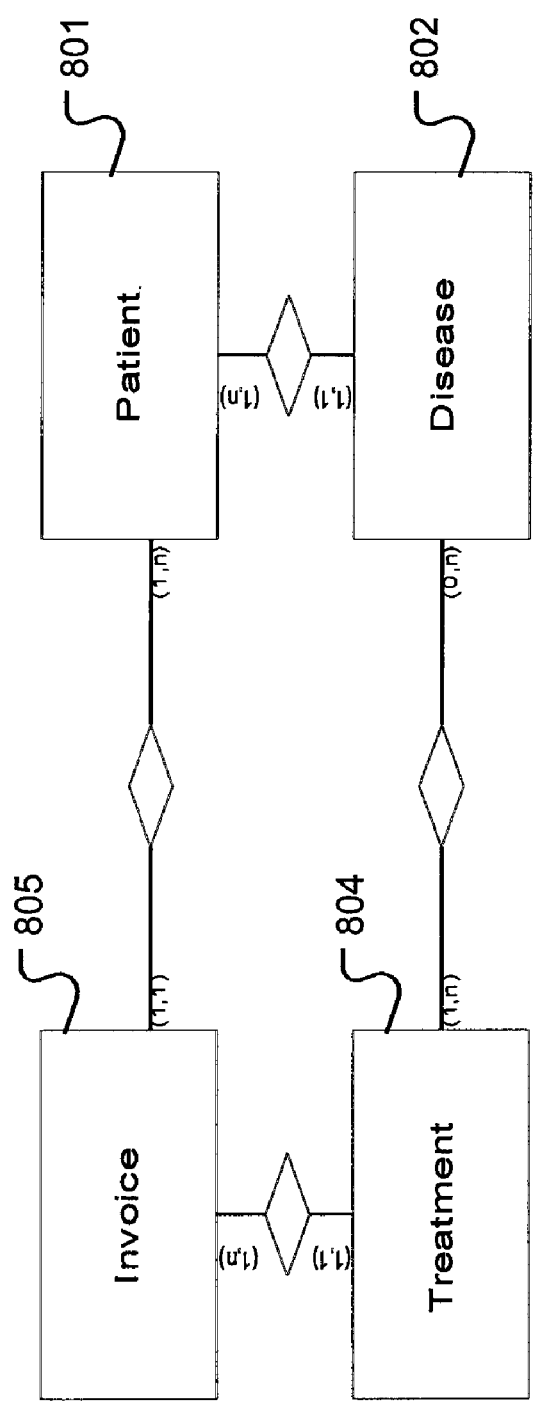
FIG. 8 is a block diagram illustrating exemplary contexts provided to an external rule engine.

FIG. 8 is a block diagram illustrating exemplary contexts provided to an external rule engine. The contexts may include patient information 801, disease history information 802, treatment information 804, and invoice information 805. The patient information 801 for one patient may include age, insurance identification number, and quantity of children. The disease history information 802 may describe the time of occurrence and/or cure of a disease. The invoice information 804 specifies the general information about the payment, such as an invoice date and an invoice number, for unexceptional treatments. The treatment information 804 is assigned to one invoice and at least one disease.

Before a local rule engine may provide the patient information 801, the disease history information 802, the treatment information 804, or the invoice information 805 to an external insurance fraud detection rule engine, a vocabulary is generated based on the description of data that may be communicated. Tables 4 to 7 respectively list the data descriptions (including a data attribute and an associated data type) for each exemplary context associated with the patient information 801, the disease history information 802, the treatment information 804, and the invoice information 805, thereby defining and describing the universe of discourse between the local rule engine and the external rule engine.

TABLE 4

Patient Information Data Descriptions

| Attribute | Value Type |
|---|---|
| Name | Text |
| Insurance Number | Text |
| Age | Number (only positive values) |
| Sex | Set (male/female) |
| Number of Children | Number (only positive values) |

TABLE 5

Disease History Information Data Descriptions

| Attribute | Value Type |
|---|---|
| Disease ID | Number |
| Disease | Text |
| Disease Type | Set (Initial, recurrent, chronic) |
| Occurrence Date | Date |
| Recognition Date | Date |
| Cured Date | Date |

TABLE 6

Treatment Information Data Descriptions

| Attribute | Value Type |
|---|---|
| Disease | Number |
| Treatment | Text |
| Treatment Type | Set (Initial, Follow-Up) |
| Treatment Category | Set (Medicine, Bandage, Consultative Conversation, Surgery, Rehabilitation, Psychological Therapy, . . . ) |
| Treatment Amount | Number (only positive values) |
| Treatment Frequency | Number (only positive values) |

TABLE 7

Invoice Information Data Descriptions

| Attribute | Value Type |
|---|---|
| Invoice Number | Number |
| Invoice Date | Date |

Within the local rule engine, three data object types are possible: data elements, structures, and tables. A data element data object types may include a Boolean type, a text type, a number type, an amount type, a quantity type, and a timepoint type. A structure data object includes a set of data elements, and a table includes a structure with a header definition.

Figure 9:
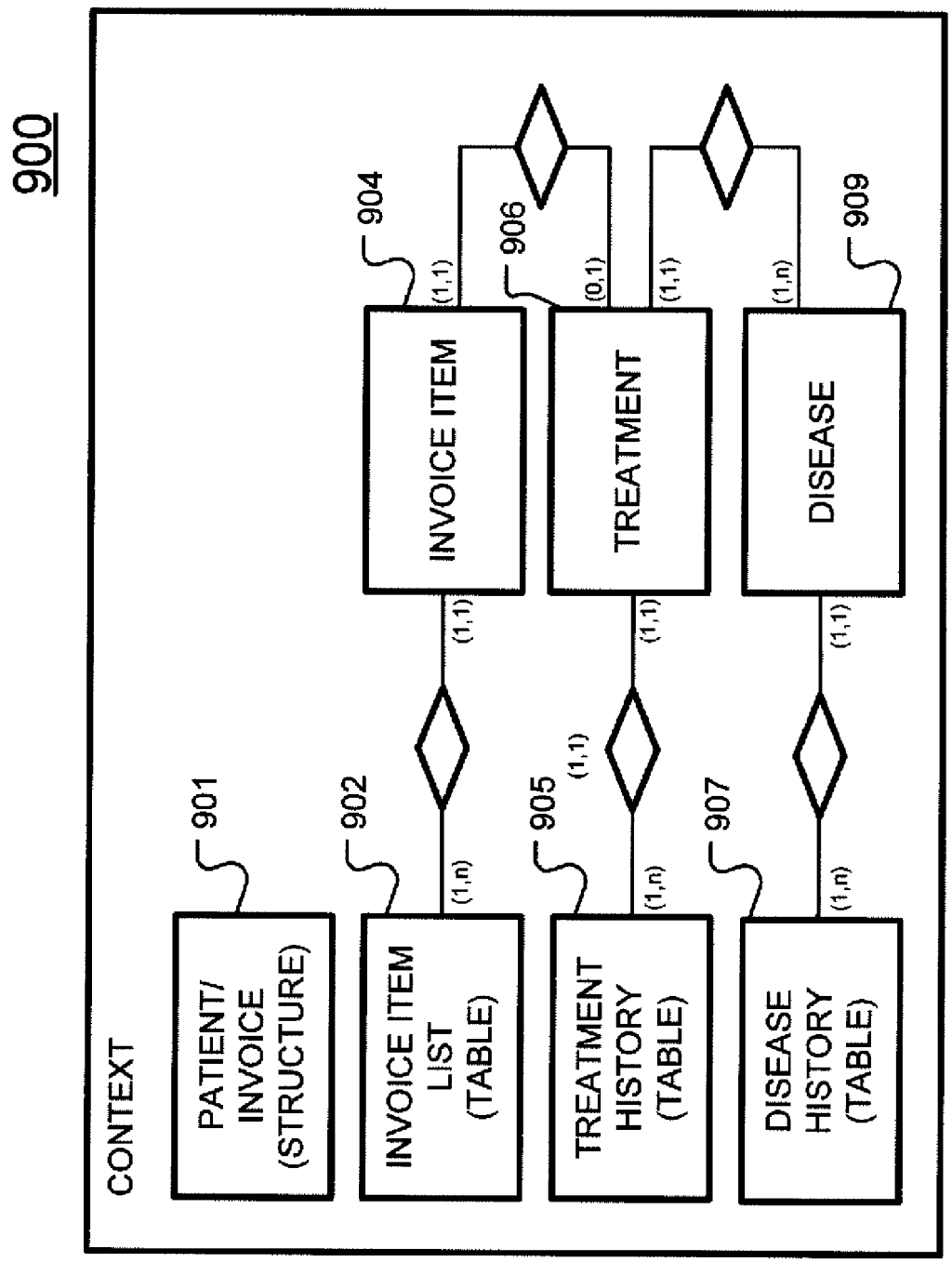
FIG. 9 illustrates an exemplary logical model used to adapt data objects for an exemplary context.

FIG. 9 illustrates an exemplary logical model 900 used to logically adapt data objects for an exemplary context. The logical model 900 is adapted into four data objects for the context: an invoice head 901 including all elements defining the invoice and the patient; a invoice item list 902 including a table of invoice item references 904 to treatments in the treatment history; a treatment history 905 including a table of treatments 906 with all attributes, with a reference key to an entry in the disease history; and a disease history table 907 of diseases 909.

The context is transmitted to the external rule engine as an XSD. Each XSD element is annotated with an appinfo element specifying the concept name of the element. This concept name can be used for the rule definition. Table 12 lists the resulting XSD Document, and Tables 8 to 11 respectively list the invoice head, invoice item list, treatment history, and disease history that is passed to the external rule engine during runtime.

TABLE 8

Invoice Head Context Data

| | |
|---|---|
| Patient's first name | John |
| Patient's surname | Doe |
| Patient's age | 25 |
| Patient's sex | Male |
| Patient's number of children | 3 |
| Insurance Number | 12345677 |
| Invoice Date: 2006-06-06 | 2006-06-06 |
| Invoice No. | <not set> |

TABLE 9

Invoice Items Context Data

| ID | Reference |
|---|---|
| I1 | T8 |
| I2 | T9 |

TABLE 10

Treatment History Context Data

| ID | Name | Code | Trtmt. Ref | Quant. | Freq. | Begin | Type | Category | Prscrptn. Date |
|---|---|---|---|---|---|---|---|---|---|
| T1 | Massage | PhysMassage | D1 | 10 ST | 3/week | 2005-04-12 | Initial | Physio. | 2005-04-12 |
| T2 | Voltaren N3 | VoltN3 | D1 | 5 WKS | 2/day | 2005-02-05 | Initial | Medicine | 2005-02-05 |
| T3 | Manual Therapy | PysManual | D1 | 15 ST | 3/week | 2005-02-05 | Initial | Physio. | 2005-02-12 |
| T4 | Sinupret forte Dragees N2 | SinuN2 | D2 | 2 WKS | 3/day | 2005-04-11 | Initial | Medicine | 2005-04-11 |
| T5 | Sinupret forte Dragees N2 | SinuN2 | D2 | 2 WKS | 3/day | 2006-04-26 | Follow-Up | Medicine | 2006-04-11 |
| T6 | Lorano N2 | LoraN2 | D3 | 2 WKS | 3/day | 2005-04-11 | Initial | Medicine | 2005-04-11 |
| T7 | Glasses | Glasses | D4 | 1 ST | Daily | 2005-05-11 | Initial | Opthalmol. | 2005-05-11 |
| T8 | Massage | PhysManual | D1 | 10 ST | 3/week | 2006-10-10 | Follow-Up | Physio. | 2006-10-10 |
| T9 | Glasses | Glasses | D4 | 1 ST | Daily | 2006-10-10 | Follow-Up | Ophtalmol. | 2006-10-10 |

TABLE 11

Disease History Context Data

| ID | Name | Code | Occurrence Date | Recognition Date | Cured Date | Type |
|----|------|------|-----------------|------------------|------------|------|
| D1 | Luxation of the Knee | Lux23I | 2005-04-10 | 2005-04-10 | | Initial |
| D2 | Sinusitis | Sinus2 | 2005-10-01 | 2005-10-11 | | Initial |
| D3 | Pollinosis | Poll2 | 2005-05-11 | | | Chronic |
| D4 | Nearsightness | EyeNearSig | 2005-04-11 | | | Chronic |

Figure 10:
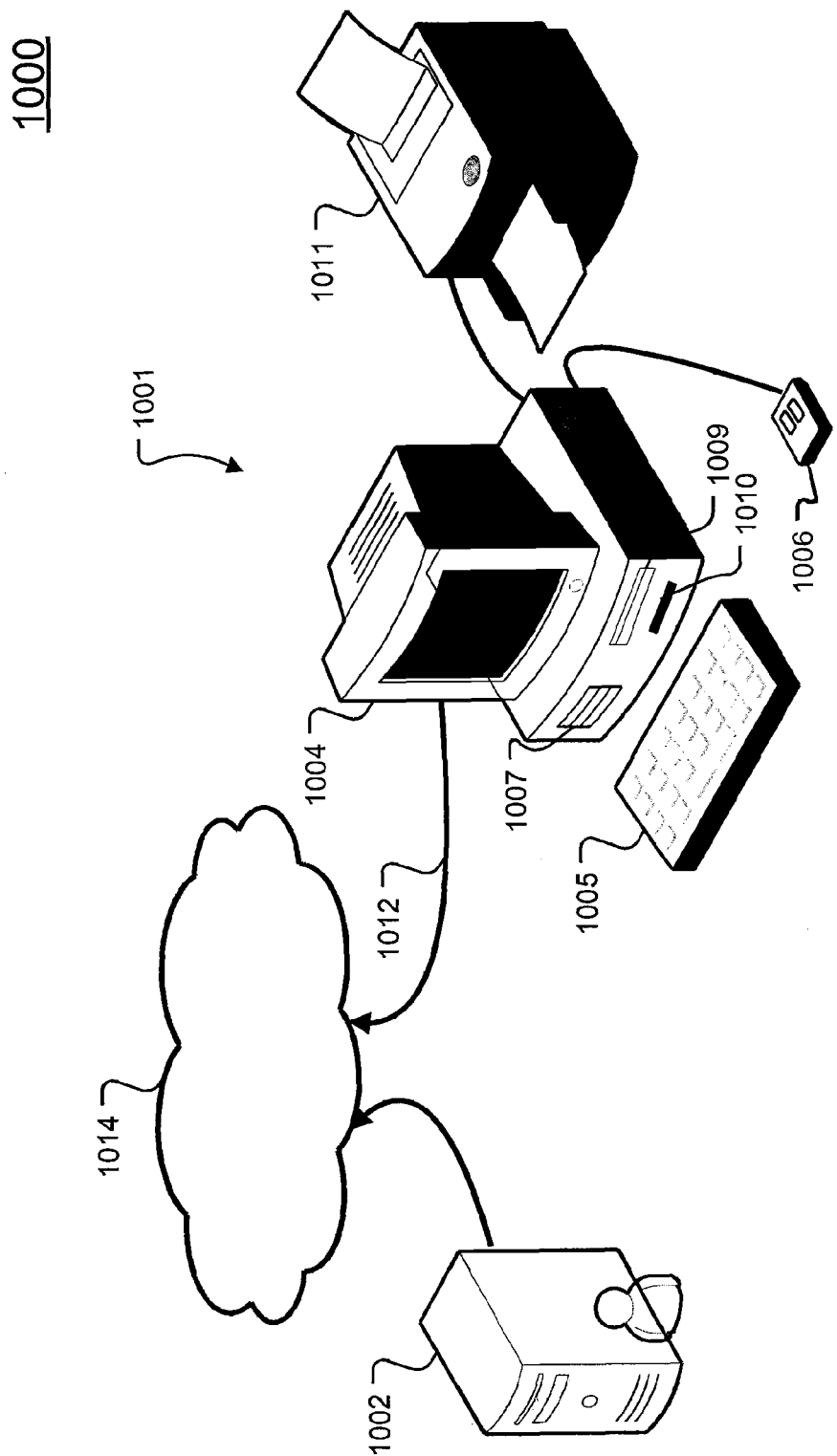
FIG. 10 illustrates the exterior appearance of an exemplary system.

FIG. 10 illustrates the exterior appearance of an exemplary system 1000 that implements the enhanced rule engine, according to another general implementation. Briefly, the system 1000 includes a device 1001 that implements a local rule engine, and a server 1002 that implements an external rule engine. As is described in more detail, below, the device 1001 includes a processor, an interface, and an output module. The processor automatically generates a rule engine vocabulary including a context description and a result description that respectively define an input to and an output of an external rule engine, and serializes the rule engine vocabulary in a schema document that, when received at the external rule engine, allows a rule to be defined based on the context description and the result description. The interface transmits the schema document to the external rule engine, transmits a context specified according to the context description as the input to the external rule engine, for evaluation by the rule, and receives a rule-evaluated result specified according to the result description as the output of the external rule engine. The output module outputs the result.

In more detail, the hardware environment of the device 1001 includes a display monitor 1004 for displaying text and images to a user, a keyboard 1005 for entering text data and user commands into the device 1001, a mouse 1006 for pointing, selecting and adjusting objects displayed on the display monitor 1004, a fixed disk drive 1007, a removable disk drive 1009, a tape drive 1010, a hardcopy output device 1011, and a computer network connection 1012.

The display monitor 1004 displays graphics, images, and text that comprise the display for the software applications used by the device 1001, as well as the operating system programs necessary to operate the device 1001. A user uses the keyboard 1005 to enter commands and data to operate and control the computer operating system programs, the web browser, and/or the rule engine. The user uses the mouse 1006 to select and adjust graphics and text objects displayed on the display monitor 1004 as part of the interaction with and control of the device 1001 and applications running on the device 1001. The mouse 1006 is any type of pointing device, and may be a joystick, a trackball, a touch-pad, or other pointing device.

In a further implementation, the fixed disk drive 1007 itself may include a number of physical drive units, such as a redundant array of independent disks ("RAID"), or may be a disk drive farm or a disk array that is physically located in a separate computing unit. Such computer readable memory media allow the device 1001 to access computer-executable process steps, application programs and the like, stored on removable and non-removable memory media.

The wireless or wireline computer network connection 1012 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1014 may be one or more of a LAN network, a corporate or government WAN network, the Internet, or other network.

The computer network connection 1012 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 1009 is a removable storage device that is used to off-load data from the device 1001 or upload data onto the device 1001. The removable disk drive 1009 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1007 or on removable media for the removable disk drive 1009.

The tape drive 1010 is a tape storage device that is used to off-load data from the device 1001 or to upload data onto the device 1001. The tape drive 1010 may be a quarter-inch cartridge ("QIC"), 4 mm digital audio tape ("DAT"), 8 mm digital linear tape ("DLT") drive, or other type of tape.

The hardcopy output device 1011 provides an output function for the operating system programs and applications. The hardcopy output device 1011 may be a printer or any output device that produces tangible output objects, including textual or image data or graphical representations of textual or image data. While the hardcopy output device 1011 is depicted as being directly connected to the device 1001, it need not be. For instance, the hardcopy output device 1011 may be connected to device 1001 via a network interface, such as a wireline or wireless network.

Furthermore, although the device 1001 is illustrated in FIG. 10 as a desktop PC, in further implementations the device 1001 may be a laptop, a workstation, a midrange computer, a mainframe, an embedded system, telephone, a handheld or tablet computer, a PDA, or other type of device that includes a data processing apparatus.

Figure 11:
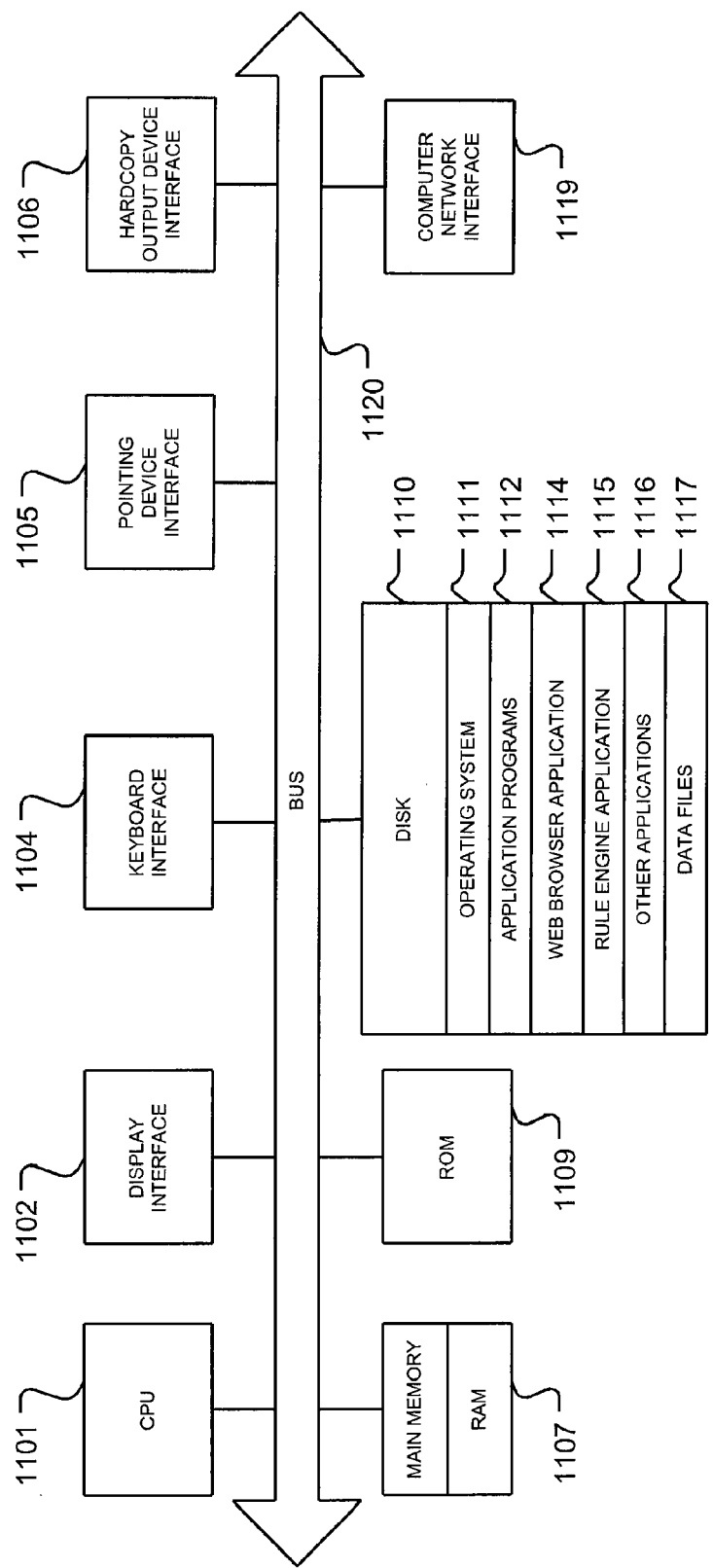
FIG. 11 is a block diagram illustrating the internal architecture of the device shown in FIG. 10.

FIG. 11 is a block diagram illustrating the internal architecture of one computer shown in FIG. 10. The computing environment includes a computer central processing unit ("CPU") 1101 where the computer instructions that comprise an operating system or an application are processed; a display interface 1102 which provides a communication interface and processing functions for rendering graphics, images, and texts on the display monitor 1004; a keyboard interface 1104 which provides a communication interface to the keyboard 1005; a pointing device interface 1105 which provides a communication interface to the mouse 1006 or an equivalent pointing device; a hardcopy output device interface 1106 which provides a communication interface to the hardcopy output device 1011; a random access memory ("RAM") 1107 where computer instructions and data are stored in a volatile memory device for processing by the computer CPU 1101; a read-only memory ("ROM") 1109 where invariant low-level systems code or data for basic system functions such as basic input and output ("I/O"), startup, or reception of keystrokes from the keyboard 1005 are stored in a non-volatile memory device; a storage medium 1110 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1111, application programs 1112 (including web browser application 1114, rule engine application 1115, and other applications 1116 as necessary) and data files 1117 are stored; and a computer network interface 1119 which provides a communication interface to the network 1014 over the computer network connection 1012. The constituent devices and the computer CPU 1101 communicate with each other over the computer bus 1120.

The rule engine application 1115 may be an SAP® rule engine, a Workflow Magic rule engine, an OpenLexicon rule engine, an OpenRules rule engine, a NxBRE rule engine, a Rools rule engine, a JBoss Rules rule engine, or any other software system that helps manage and automate business rules.

Briefly, a computer program product is tangibly embodied in the machine-readable storage medium 1110. The computer program product includes instructions that, when read by a machine, operate to cause a data processing apparatus (such as the CPU 1101) to automatically generate a rule engine vocabulary including a context description and a result description that respectively define an input to and an output of an external rule engine, to serialize the rule engine vocabulary in a schema document that, when received at the external rule engine, allows a rule to be defined based on the context description and the result description, and to transmit the schema document to the external rule engine. The computer program product also includes instructions that, when read by a machine, operate to cause a data processing apparatus to transmit a context specified according to the context description as the input to the external rule engine, for evaluation by the rule, to receive a rule-evaluated result specified according to the result description as the output of the external rule engine, and to output the result.

The RAM 1107 interfaces with the computer bus 1120 so as to provide quick RAM storage to the computer CPU 1101 during the execution of software programs such as the operating system application programs, and device drivers. More specifically, the computer CPU 1101 loads computer-executable process steps from the fixed disk drive 1007 or other media into a field of the RAM 1107 in order to execute software programs. Data is stored in the RAM 1107, where the data is accessed by the computer CPU 1101 during execution.

Also shown in FIG. 11, the device 1001 stores computer-executable code for a operating system 11111, and application programs 1112 such as word processing, spreadsheet, presentation, gaming, web browsing, JavaScript engine, or other applications. Although it is possible to provide for the enhanced rule engine using the above-described implementation, it is also possible to implement the functions according to the present disclosure as a dynamic link library ("DLL"), or as a plug-in to other application programs such as an Internet web-browser such as the APPLE® SAFARI® web browser or the MICROSOFT® INTERNET EXPLORER® web browser.

The computer CPU 1101 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1101 is more than one processing unit, including a multiple CPU configuration found in high-performance workstations and servers, or a multiple scalable processing unit found in mainframes.

The operating system 1111 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX® flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1111 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 10 and 11 illustrate one possible implementation of a computing system that executes program code, or program or process steps, configured to effectuate an enhanced rule engine, other types of computers may also be used as well.

As to formal matters, while the term "user" has been consistently used to describe an entity that interacts with these processes, such a generalization is also intended to describe multiple related or unrelated, living or automated entities or beings that interact with these processes at various different, overlapping or non-overlapping states.

In a similar vein, the term "selection" is intended to denote throughout a manual selection by a human, an automatic selection by a non-human, or some combination thereof.

Finally, it is noted that, for the sake of brevity, the terms "Java" and "JavaScript" are intended to reference the SUN MICROSYSTEMS® JAVASCRIPT® programming language, and the term "XML" is intended to reference 'eXtensible Markup Language' throughout.

A number of implementations have been described. Nevertheless, it will be understood that various modifications may be made without departing from the scope of the disclosure. Accordingly, other implementations are within the scope of the following claims.

TABLE 12

Exemplary XSD For Insurance Fraud Use Case.

```xml
<?xml version="1.0"?>
<xs:schema elementFormDefault="qualified"
    xmlns:bv="http://www.sap.corp/FDT_Semantic"
    xmlns:xs="http://www.w3.org/2001/XMLSchema"
    xmlns:xsi="http://www.w3.org/2001/XMLSchema-instance"
    xsi:schemaLocation="http://www.sap.corp/FDT_Semantic
C:\FBI\workspace\FDT_Haley_Connection\knowledgebase\BVSchema.xsd">
    <xs:import namespace=http://www.sap.corp/FDT_Semantic
schemaLocation="C:\FBI\workspace\FDT_Haley_Connection\knowledgebase\BVSchema.xsd" />
    <xs:element name="FDT_CONTEXT">
        <xs:complexType><xs:sequence>
            <xs:element name="INVOICE_HEAD">
                <xs:annotation>
                    <xs:appinfo>
                        <bv:concept_name>Invoice Head</bv:concept_name>
                    </xs:appinfo>
                </xs:annotation>
                <xs:complexType><xs:sequence minOccurs="0">
                    <xs:element name="PATIENT_FIRSTNAME" type="FDT_Element_Text">
                        <xs:annotation>
                            <xs:appinfo>
                                <bv:concept_name>Patient's Firstname</bv:concept_name>
                            </xs:appinfo>
                        </xs:annotation>
                    </xs:element>
                    <xs:element name="PATIENT_SURNAME" type="FDT_Element_Text">
                        <xs:annotation>
                            <xs:appinfo>
                                <bv:concept_name>Patient's Surname</bv:concept_name>
                            </xs:appinfo>
                        </xs:annotation>
                    </xs:element>
                    <xs:element name="PATIENT_AGE" type="FDT_Element_Number">
                        <xs:annotation>
                            <xs:appinfo>
                                <bv:concept_name>Patlent's Age</bv:concept_name>
                            </xs:appinfo>
                        </xs:annotation>
                    </xs:element>
                    <xs:element name="PATIENT_SEX" type="FDT_Element_Text">
                        <xs:annotation>
                            <xs:appinfo>
                                <bv:concept_name>Patient's Sex</bv:concept_name>
                            </xs:appinfo>
                        </xs:annotation>
                    </xs:element>
                    <xs:element name="PATIENT_CHILDREN" type="FDT_Element_Number">
                        <xs:annotation>
                            <xs:appinfo>
                                <bv:concept_name>Number of Children</bv:concept_name>
                            </xs:appinfo>
                        </xs:annotation>
                    </xs:element>
                    <xs:element name="PATIENT_INSURANCE_NUMBER" type="FDT_Element_Text">
                        <xs:annotation>
                            <xs:appinfo>
                                <bv:concept_name>Patient's Insurance Number</bv:concept_name>
                            </xs:appinfo>
                        </xs:annotation>
                    </xs:element>
                    <xs:element name="INVOICE_DATE" type="FDT_Element_Timepoint">
                        <xs:annotation>
                            <xs:appinfo>
                                <bv:concept_name>Invoice Date</bv:concept_name>
                            </xs:appinfo>
                        </xs:annotation>
                    </xs:element>
                    <xs:element name="INVOICE_NO" type="FDT_Element_Text">
                        <xs:annotation>
                            <xs:appinfo>
                                <bv:concept_name>Invoice Number</bv:concept_name>
```

TABLE 12-continued

Exemplary XSD For Insurance Fraud Use Case.

```
            </xs:appinfo>
          </xs:annotation>
        </xs:element>
    </xs:sequence></xs:complexType>
</xs:element>
<xs:element name="INVOICE_ITEMS">
    <xs:annotation>
      <xs:appinfo>
        <bv:concept_name>Invoice Item List</bv:concept_name>
      </xs:appinfo>
    </xs:annotation>
    <xs:complexType><xs:sequence maxOccurs="unbounded">
        <xs:element name="ROW">
          <xs:complexType>
            <xs:complexContent>
              <xs:extension base="FDT_Structure">
                <xs:sequence minOccurs="0">
                  <xs:element name="INVOICE_ITEM_ID" type="FDT_Element_Text">
                    <xs:annotation>
                      <xs:appinfo>
                        <bv:concept_name>ID</bv:concept_name>
                      </xs:appinfo>
                    </xs:annotation>
                  </xs:element>
                  <xs:element name="INVOICE_ITEM_TM_REF" type="FDT_Element_Text">
                    <xs:annotation>
                      <xs:appinfo>
                        <bv:concept_name> Treatment Ref</bv:concept_name>
                      </xs:appinfo>
                    </xs:annotation>
                  </xs:element>
                </xs:sequence>
              </xs:extension>
            </xs:complexContent>
          </xs:complexType>
        </xs:element>
    </xs:sequence></xs:complexType>
</xs:element>
<xs:element name="TREATMENT_HISTORY">
    <xs:annotation>
      <xs:appinfo>
        <bv:concept_name>Treatment History</bv:concept_name>
      </xs:appinfo>
    </xs:annotation>
    <xs:complexType><xs:sequence maxOccurs="unbounded">
        <xs:element name="ROW">
          <xs:complexType><xs:complexContent>
              <xs:extension base="FDT_Structure"> <xs:sequence minOccurs="0">
                  <xs:element name="TREATMENT_KEY" type="FDT_Element_Text">
                    <xs:annotation>
                      <xs:appinfo>
                        <bv:concept_name>ID</bv:concept_name>
                      </xs:appinfo>
                    </xs:annotation>
                  </xs:element>
                  <xs:element name="TREATMENT_NAME" type="FDT_Element_Text">
                    <xs:annotation>
                      <xs:appinfo>
                        <bv:concept_name>Treatment Name</bv:concept_name>
                      </xs:appinfo>
                    </xs:annotation>
                  </xs:element>
                  <xs:element name="TREATMENT_CODE" type="FDT_Element_Text">
                    <xs:annotation>
                      <xs:appinfo>
                        <bv:concept_name>Treatment Code</bv:concept_name>
                      </xs:appinfo>
                    </xs:annotation>
                  </xs:element>
                  <xs:element name="TREATMENT_TO_DISEASE" type="FDT_Element_Text">
                    <xs:annotation>
                      <xs:appinfo>
                        <bv:concept_name>Diseases cured by Treatment</bv:concept_name>
                      </xs:appinfo>
                    </xs:annotation>
                  </xs:element>
                  <xs:element name="TREATMENT_QUANTITY" type="FDT_Element_Quantity">
                    <xs:annotation>
```

TABLE 12-continued

Exemplary XSD For Insurance Fraud Use Case.

```xml
            <xs:appinfo>
                <bv:concept_name>Treatment Amount</bv:concept_name>
            </xs:appinfo>
        </xs:annotation>
    </xs:element>
    <xs:element name="TREATMENT_FREQUENCY" type="FDT_Element_Text">
        <xs:annotation>
            <xs:appinfo>
                <bv:concept_name>Treatment Freqency</bv:concept_name>
            </xs:appinfo>
        </xs:annotation>
    </xs:element>
    <xs:element name="TREATMENT_BEGINNING" type="FDT_Element_Timepoint">
        <xs:annotation>
            <xs:appinfo>
                <bv:concept_name>Treatments Beginning</bv:concept_name>
            </xs:appinfo>
        </xs:annotation>
    </xs:element>
    <xs:element name="TREATMENT_TYPE" type="FDT_Element_Text">
        <xs:annotation>
            <xs:appinfo>
                <bv:concept_name>Treatment Type</bv:concept_name>
            </xs:appinfo>
        </xs:annotation>
    </xs:element>
    <xs:element name="TREATMENT_CATEGORY" type="FDT_Element_Text">
        <xs:annotation>
            <xs:appinfo>
                <bv:concept_name>Treatment Category</bv:concept_name>
            </xs:appinfo>
        </xs:annotation>
    </xs:element>
            </xs:sequence></xs:extension>
        </xs:complexContent></xs:complexType>
    </xs:element>
</xs:sequence></xs:complexType>
</xs:element>
<xs:element name="DISEASE_HISTORY">
    <xs:annotation>
        <xs:appinfo>
            <bv:concept_name>Disease History</bv:concept_name>
        </xs:appinfo>
    </xs:annotation>
    <xs:complexType><xs:sequence maxOccurs="unbounded">
        <xs:element name="ROW">
            <xs:complexType><xs:complexContent>
                <xs:extension base="FDT_Structure"> <xs:sequence minOccurs="0">
                    <xs:element name="DISEASE_KEY" type="FDT_Element_Text">
                        <xs:annotation>
                            <xs:appinfo>
                                <bv:concept_name>ID</bv:concept_name>
                            </xs:appinfo>
                        </xs:annotation>
                    </xs:element>
                    <xs:element name="DISEASE_NAME" type="FDT_Element_Text">
                        <xs:annotation>
                            <xs:appinfo>
                                <bv:concept_name>Disease Name</bv:concept_name>
                            </xs:appinfo>
                        </xs:annotation>
                    </xs:element>
                    <xs:element name="DISEASE_CODE" type="FDT_Element_Text">
                        <xs:annotation>
                            <xs:appinfo>
                                <bv:concept_name>Disease Code</bv:concept_name>
                            </xs:appinfo>
                        </xs:annotation>
                    </xs:element>
                    <xs:element name="OCCURENCE_DATE" type="FDT_Element_Timepoint">
                        <xs:annotation>
                            <xs:appinfo>
                                <bv:concept_name>First Occurence Date</bv:concept_name>
                            </xs:appinfo>
                        </xs:annotation>
                    </xs:element>
                    <xs:element name="CURED_DATE" type="FDT_Element_Timepoint">
                        <xs:annotation>
```

TABLE 12-continued

Exemplary XSD For Insurance Fraud Use Case.

```
            <xs:appinfo>
                <bv:concept_name>Cured Date</bv:concept_name>
            </xs:appinfo>
          </xs:annotation>
        </xs:element>
        <xs:element name="RECOGNITION_DATE" type="FDT_Element_Timepoint">
          <xs:annotation>
            <xs:appinfo>
              <bv:concept_name>Recognition Date</bv:concept_name>
            </xs:appinfo>
          </xs:annotation>
        </xs:element>
        <xs:element name="DISEASE_TYPE" type="FDT_Element_Text">
          <xs:annotation>
            <xs:appinfo>
              <bv:concept_name>Disease Type</bv:concept_name>
            </xs:appinfo>
          </xs:annotation>
        </xs:element>
      </xs:sequence></xs:extension>
    </xs:complexContent></xs:complexType>
  </xs:element>
    </xs:sequence></xs:complexType>
  </xs:element>
    </xs:sequence></xs:complexType>
</xs:element>
</xs:schema>
```

What is claimed is:

1. A computer-implemented method comprising:

automatically generating, at a local rule engine, a rule engine vocabulary comprising a context description and a result description that respectively define an input to and an output of an external rule engine, the rule engine vocabulary defining a data type of a result;

serializing the rule engine vocabulary in a schema document that, when received at the external rule engine, allows a rule to be defined by the external rule engine based on the context description and the result description;

transmitting the schema document to the external rule engine;

transmitting a context specified according to the context description as the input to the external rule engine, for evaluation by the rule to provide the result corresponding to the data type;

receiving, at the local rule engine, the result specified according to the result description as the output of the external rule engine; and outputting the result.

2. The method of claim 1, wherein the rule engine vocabulary is generated based on using generic data structures.

3. The method of claim 2, wherein the generic data structures further comprise a field, structure, or table data element.

4. The method of claim 1, further comprising:

defining an expression including a connection to the external rule engine; and passing the context to the expression, thereby causing the schema document and the context to be transmitted via the connection, and the result to be received via the connection.

5. The method of claim 4, wherein defining the expression further comprises:

querying the rule engine to determine connection parameters; and selecting the defined expression from a list of possible expressions based on the determined connection parameters.

6. The method of claim 4, wherein the context is automatically transmitted to the external rule engine via a remote procedure call, if the expression is triggered.

7. The method of claim 6, wherein the result is received via the remote procedure call.

8. The method of claim 6, wherein the remote procedure call is a SUN MICROSYSTEMS® JAVA® programming language remote procedure call.

9. The method of claim 1, wherein the context description further comprises a context data type.

10. The method of claim 9, wherein the context data type is native to the external rule engine.

11. The method of claim 1, wherein the schema document expresses a set of rules to which a document must conform to be considered a valid document according to an underlying schema.

12. The method of claim 1, wherein the context is transmitted as an eXtensible Markup Language (XML) Schema Document (XSD).

13. The method of claim 1, wherein the rule is a business rule that is proprietary to an operator of the external rule engine.

14. The method of claim 1, wherein the schema document is an eXtensible Markup Language (XML) Schema Document (XSD).

15. The method of claim 1, wherein the external rule engine comprises a Business Rule Management System (BRMS).

16. The method of claim 1, wherein the rule engine vocabulary is a business vocabulary.

17. The method of claim 1, wherein the external rule engine is a business rule engine.

18. The method of claim 1, wherein the rule is a business rule.

19. A computer program product, tangibly embodied in a non-transitory machine-readable storage device, the computer program product comprising instructions that, when read by a machine, operate to cause a data processing apparatus to:

automatically generate, at a local rule engine, a rule engine vocabulary comprising a context description and a result description that respectively define an input to and an output of an external rule engine, the rule engine vocabulary defining a data type of a result;

serialize the rule engine vocabulary in a schema document that, when received at the external rule engine, allows a rule to be defined by the external rule engine based on the context description and the result description;

transmit the schema document to the external rule engine;

transmit a context specified according to the context description as the input to the external rule engine, for evaluation by the rule to provide the result corresponding to the data type;

receive, at the local rule engine, the result specified according to the result description as the output of the external rule engine; and output the result.

20. A device comprising:

a processor configured to:
- automatically generate, at a local rule engine, a rule engine vocabulary comprising a context description and a result description that respectively define an input to and an output of an external rule engine, the rule engine vocabulary defining a data type of a result, and
- serialize the rule engine vocabulary in a schema document that, when received at the external rule engine, allows a rule to be defined by the external rule engine based on the context description and the result description;

an interface configured to:
- transmit the schema document to the external rule engine,
- transmit a context specified according to the context description as the input to the external rule engine, for evaluation by the rule to provide the result corresponding to the data type, and
- receive, at the local rule engine, the result specified according to the result description as the output of the external rule engine; and an output module configured to output the result.

* * * * *